United States Patent
Mao et al.

(10) Patent No.: US 9,927,639 B2
(45) Date of Patent: Mar. 27, 2018

(54) ATHERMAL FARADAY ROTATOR MIRROR

(71) Applicant: Oplink Communications, LLC, Fremont, CA (US)

(72) Inventors: Hongwei Mao, Fremont, CA (US); Daxin Chen, Zhuhai (CN); Zexiong Zhao, Zhuhai (CN); Jinyuan Qiao, Cupertino, CA (US); Miao Yang, San Jose, CA (US); Linhu Li, Feilongzhen (CN)

(73) Assignee: Oplink Communications, LLC, Fremont, CA (US)

( * ) Notice: Subject to any disclaimer, the term of this patent is extended or adjusted under 35 U.S.C. 154(b) by 0 days.

(21) Appl. No.: 14/610,265

(22) Filed: Jan. 30, 2015

(65) Prior Publication Data

US 2015/0212347 A1   Jul. 30, 2015

Related U.S. Application Data

(60) Provisional application No. 61/933,424, filed on Jan. 30, 2014.

(51) Int. Cl.
 *G02F 1/09* (2006.01)

(52) U.S. Cl.
 CPC .......... *G02F 1/093* (2013.01); *G02F 2201/16* (2013.01)

(58) Field of Classification Search
 CPC ...... G02B 5/30; G02B 5/3025; G02B 5/3083; G02B 27/28; G02B 27/286; G02B 6/27; G02F 1/09; G02F 1/091; G02F 1/092; G02F 1/093; G02F 1/095; G02F 1/0955; G02F 2001/09; G02F 2001/094; G01R 15/24; G01R 15/245; G01R 15/246; H01P 1/17; H01P 1/174; H01P 1/175; H01P 1/393
 USPC ............ 359/483.01, 484.01, 484.02, 484.03, 359/484.04, 484.1; 324/96
 See application file for complete search history.

(56) References Cited

U.S. PATENT DOCUMENTS

| | | | | |
|---|---|---|---|---|
| 4,756,607 A * | 7/1988 | Watanabe | ............... | G02F 1/093 359/282 |
| 5,105,307 A * | 4/1992 | Nishiyama | .............. | G02F 1/093 359/484.03 |
| 5,278,853 A * | 1/1994 | Shirai | .................. | G02B 6/2746 372/37 |
| 6,351,331 B1 * | 2/2002 | Fukuda | ................. | G02F 1/0036 117/942 |
| 2004/0027637 A1 * | 2/2004 | Sahashi | ..................... | G02F 1/09 359/280 |
| 2004/0081392 A1 * | 4/2004 | Li | ............................. | G02F 1/09 385/22 |
| 2004/0105141 A1 * | 6/2004 | Nagaeda | ................... | G02F 1/09 359/280 |
| 2005/0111102 A1 * | 5/2005 | Iwatsuka | .............. | G02B 6/2746 359/490.02 |

(Continued)

*Primary Examiner* — Bumsuk Won
*Assistant Examiner* — Ephrem Mebrahtu
(74) *Attorney, Agent, or Firm* — Bo Huang

(57) ABSTRACT

Methods, systems, and apparatus for optical communications are provided. One of the apparatus includes a first Faraday rotator having an applied magnetic field in a first direction; a second Faraday rotator optically coupled to the first Faraday rotator, the second Faraday rotator having an applied magnetic field in a second direction in opposition to the first direction; and a mirror optically coupled to the second Faraday rotator.

13 Claims, 2 Drawing Sheets

(56) References Cited

U.S. PATENT DOCUMENTS

| | | | |
|---|---|---|---|
| 2008/0194947 A1* | 8/2008 | Kokkelink | A61B 5/0066 |
| | | | 600/425 |
| 2012/0091991 A1* | 4/2012 | Konno | G01R 15/246 |
| | | | 324/95 |
| 2012/0281724 A1* | 11/2012 | Frisken | G02B 27/286 |
| | | | 372/27 |
| 2013/0069628 A1 | 3/2013 | Konno et al. | |
| 2014/0160565 A1* | 6/2014 | Rogers | G02B 6/4208 |
| | | | 359/484.03 |

* cited by examiner

Temperature dependence of Faraday rotation angle

ATHERMAL FARADAY ROTATOR MIRROR

CROSS-REFERENCE TO RELATED APPLICATIONS

This application claims the benefit under 35 U.S.C. § 119(e) of the filing date of U.S. Patent Application No. 61/993,424, for "Athermal Faraday Rotator Mirror," which was filed on Jan. 30, 2014, and which is incorporated here by reference.

BACKGROUND

This specification relates to optical communications.

A conventional Faraday rotator mirror can be used in many applications, for example, in a fiber-optic Michelson Interferometer, a laser amplifier, or a sensor device. Conventional Faraday rotator mirrors can be used, e.g., as compensators for induced birefringence in optical fibers.

SUMMARY

In general, one innovative aspect of the subject matter described in this specification can be embodied in apparatuses that include a first Faraday rotator having an applied magnetic field in a first direction; a second Faraday rotator optically coupled to the first Faraday rotator, the second Faraday rotator having an applied magnetic field in a second direction in opposition to the first direction; and a mirror optically coupled to the second Faraday rotator.

The foregoing and other embodiments can each optionally include one or more of the following features, alone or in combination. The first Faraday rotator includes a first magneto-optic material configured to provide a first polarization rotation to light passing through the first magneto-optic material, and wherein the second Faraday rotator includes a second magneto-optic material configured to provide a second polarization rotation of light passing through the second magneto-optic material. The first polarization direction and the second polarization rotation have opposite signs. The first magnetic-optic material and the second magnetic-optic material are different garnet materials. The first Faraday rotator and the second Faraday rotator are configured to compensate for thermal drift caused by each individual Faraday rotator. The first Faraday rotator and the second Faraday rotator are configured to flatten wavelength dependent polarization rotation caused by individual Faraday rotators of the first and second Faraday rotators. The apparatus further includes an input port configured to input a light beam having one or more signal wavelengths; and an output port configured to output a light beam having one or more signal wavelengths. The polarization direction of the input light beam is rotated by 90 degrees when entering the output port. The input light beam passes through the first Faraday rotator and the second Faraday rotator before being reflected by the mirror, and wherein the light reflected from the mirror passes through the second Faraday rotator and the first Faraday rotator before passing through the output port.

In general, one innovative aspect of the subject matter described in this specification can be embodied in apparatuses that include a first Faraday rotator having an applied magnetic field in a first direction; and a second Faraday rotator having an applied magnetic field in a second direction in opposition to the first direction, wherein the polarization rotation caused by the second Faraday rotator has an opposite direction than the polarization rotation caused by the first Faraday rotator.

Particular embodiments of the subject matter described in this specification can be implemented so as to realize one or more of the following advantages. A Faraday rotator mirror is provided that compensates for thermal drift with respect to an applied polarization rotation. The Faraday rotator can also flatten wavelength dependence for applied polarization rotation.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A Faraday rotator is intended to provide a specified rotation of a polarization direction of incident light beams. In many applications, there needs to be a very accurate Faraday rotation angle. For example, in a fiber-optic interferometer, Faraday rotator mirrors are used to eliminate interference signal fluctuations due to random polarization direction changes in the optical fibers. The exact rotation provided by a conventional Faraday rotator can vary due to temperature and wavelength changes.

Figure 1:
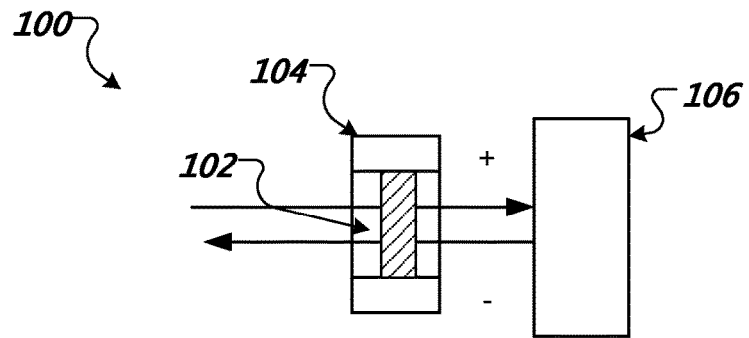
FIG. 1 is an example of a conventional Faraday rotator.

FIG. 1 is an example of a conventional Faraday rotator mirror 100. The Faraday rotator mirror 100 includes a magnetic-optical material 102, a magnetic field generating element 104, and a mirror 106. The magnetic-optical material 102 is a material that causes a rotation of polarization of light beams passing through the material in response to an applied magnetic field. For example, the magnetic-optical material 102 can be a garnet material. Garnet materials, for example, thin film garnet materials having particular chemical structures are magneto-optic. Garnet materials can be natural or synthetic including rare-earth doped garnets.

The magnetic field is caused by the magnetic field generating element 104. The magnetic field generating element 104 can be, for example, a permanent circular shaped magnet. In some other implementations, the magnetic field generating element 104 can be a wire coil wound onto a circular iron core. An electrical current can be applied to the coil to generate a magnetic field. Under the magnetic field generated by the magnetic field generating element 104, the polarization of a light beam passing through the magnetic-optical material 102 will be rotated by a specified amount. In particular, the magnetic-optical material 102 can rotate the polarization of an incident light beam by substantially 45 degrees.

In operation, an input light beam input passes though the magnetic-optical material 102, undergoing a rotation of the polarization direction of the input light beam by substantially 45 degrees. In some implementations, the input light beam is orthogonally polarized light. In some other implementations, the input light beams have been conditioned to have a single polarization direction upon entering the Faraday rotator mirror 100.

The light beam is reflected by the mirror 106 to pass back through the magnetic-optical material 102, where it undergoes an additional rotation of substantially 45 degrees in the same rotational direction. Thus, after exiting the magnetic-optical material 102 on the reflected path, a total polarization of substantially 90 degrees is realized.

The rotation angle provided by the magnetic-optical material when the magnetic field is applied typically has some variation due to temperature and the wavelengths of the light beams passing through.

Figure 2:
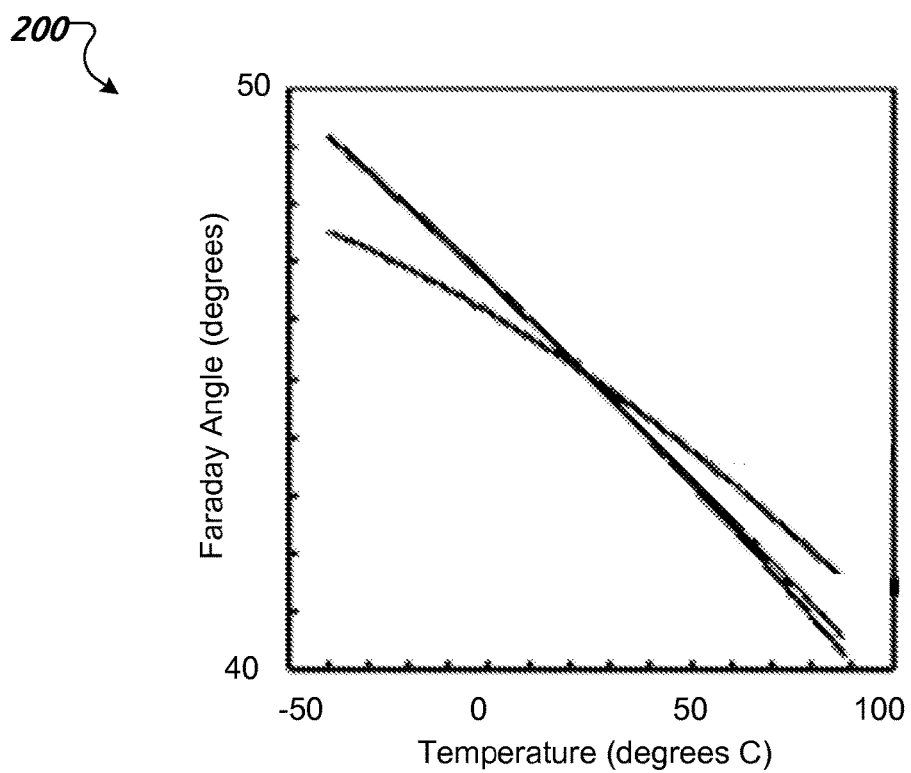
FIG. 2 is a plot showing an example of thermal drift of a Faraday rotator mirror of the Faraday rotator mirror of FIG. 1.

FIG. 2 is a plot 200 showing an example of thermal drift of a Faraday rotator mirror of the Faraday rotator mirror of FIG. 1. In particular, an x-axis corresponds to temperature while a y-axis corresponds to rotation angle in degrees. Each curve illustrates the temperature dependence of a particular wavelength of light, and different curves correspond to different types of magnetic-optical materials.

Figure 4:
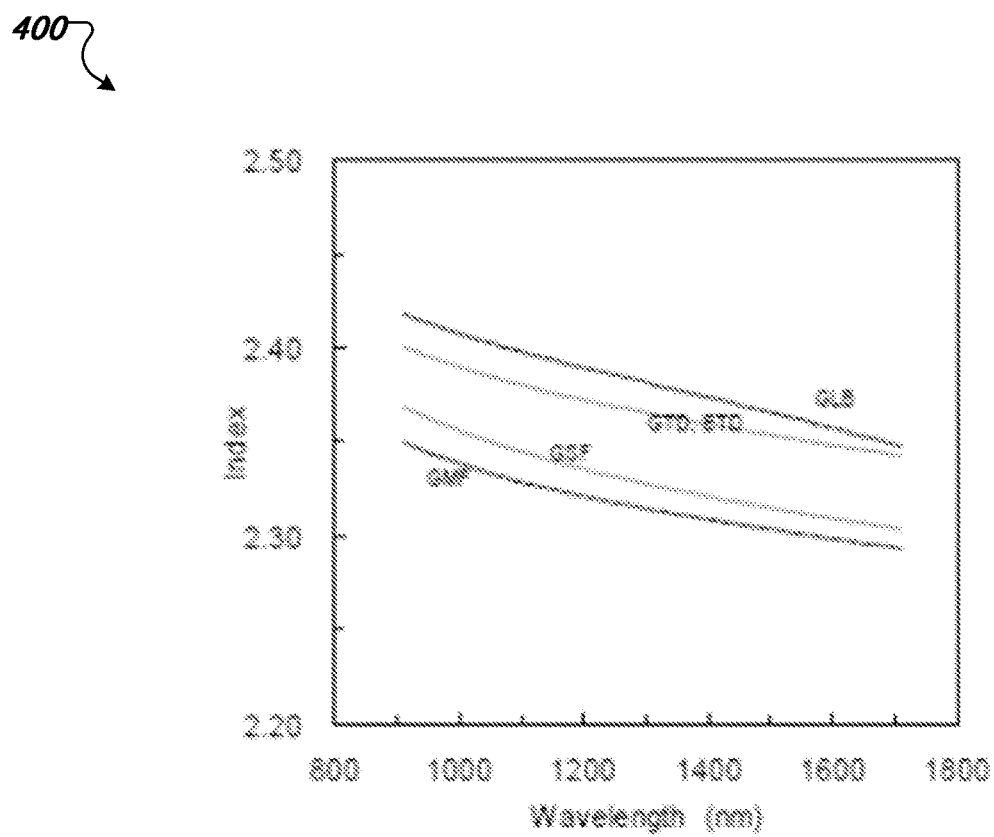
FIG. 4 is a plot showing an example of wavelength dependence according to the index for different types of Magnetic-Optical materials.

FIG. 4 is a plot 400 showing an example of wavelength dependence according to the index for different types of Magnetic-Optical materials. In particular, an x-axis corresponds to wavelength in nanometers while a y-axis corresponds to an index. The Faraday rotate angle of the Faraday rotator mirror of FIG. 1 will also show the wavelength dependence.

As noted above, in many applications, there needs to be a very accurate Faraday rotation angle controlling under various conditions. To control for thermal drift, a Faraday rotator mirror can include a composite assembly including a pair of Faraday rotators each having different magnetic-optical materials, as described below with respect to FIG. 3. In particular, the different magnetic-optical materials can be different garnet materials.

Figure 3:
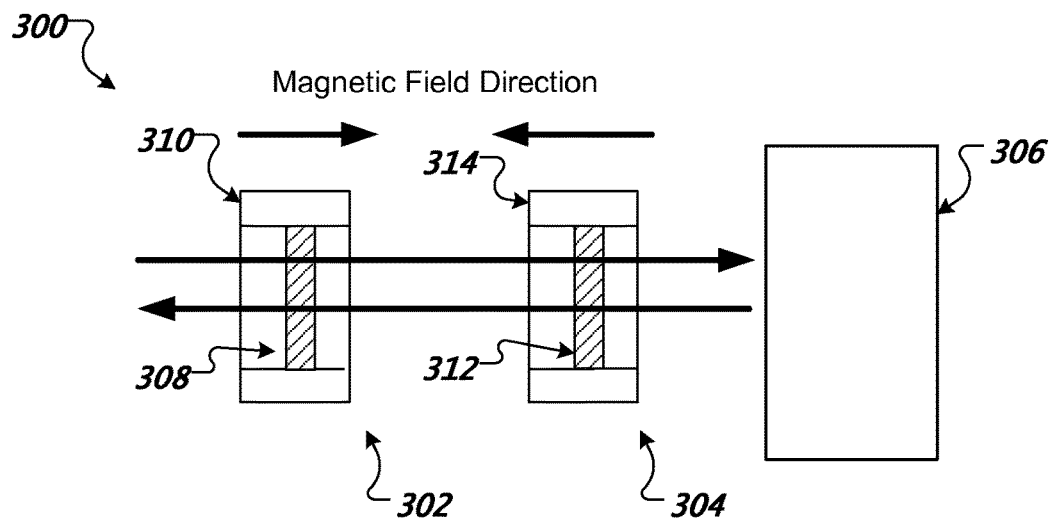
FIG. 3 is an example Faraday rotator mirror.

FIG. 3 is an example Faraday rotator mirror 300. The Faraday rotator mirror 300 includes a first rotator 302, a second rotator 304, and a mirror 306. The first rotator 302 includes a first magnetic-optic material 308 and a first magnetic field generating element 310. The second rotator 304 includes a second magnetic-optic material 312 and a second magnetic field generating element 314.

The magnetic field generating elements 310 and 314 can be, for example, a permanent circular shaped magnet or a wire coil wound onto a circular iron core, as described above with respect to FIG. 1. The first magnetic-optic material 308 can be a first garnet material while the second magnetic-optic material 312 can be a second garnet material. The garnet materials can have different thermal drift rates. Additionally, the properties of the garnet materials can be different such that when an appropriate magnetic field is applied, a specified amount of polarization rotation occurs to passing light beams.

The Faraday rotator mirror 300 is arranged such that an input light beam passes through the first magnetic-optic material 308 and the second magnetic-optic material 312 before being reflected by the mirror 306. The reflected light beam passes back through the second magnetic-optic material 312 and the first magnetic-optic material 308 before exiting the Faraday rotator mirror 300.

More specifically, the respective first and second magnetic field generating elements 310 and 314 generate a magnetic field in opposite directions. Consequently, the corresponding first and second magnetic-optic materials 308 and 312 rotate the polarization of incident light in opposite directions.

An input light beam travelling through the first magnetic-optic material 308 has its polarization rotated by a first rotational angle $\Phi_1$. Passing through the second magnetic-optical material 312, the light beam is rotated by a second rotational angle $(-\Phi_2)$. Thus, the total rotation after passing through the first and second magnetic-optical materials 308 and 312 is $\Phi_1-\Phi_2$. After reflection by the mirror 306, the light beam is again rotated by the second magnetic-optical material 312 by $(-\Phi_2)$ and by the first magnetic-optical material 308 by $\Phi_1$. Therefore, the total rotation angle for the exiting light beam is: $2\Phi_1-2\Phi_2$. If $\Phi_1-\Phi_2$ is equal to 45 degrees, the device operates as a typical Faraday rotator mirror, e.g., if $\Phi_1$ is 110 degrees and $\Phi_2$ is 65 degrees. The total polarization rotation of the Faraday rotator mirror of FIG. 3 applied to an existing light beam is therefore 90 degrees. Since the signs are opposite, the thermal drift of the faraday rotator mirror 300 can be compensated, in effect, by cancelling each other out.

Mathematically, the Faraday rotation angle $\Phi$ can be defined as:

$$\Phi = VBL, \quad (1)$$

where V is the Verdet Constant, B is the magnetic field, and L is the effective material thickness. The value of the Verdet Constant is material dependent.

Assuming that two different types of magnetic-optic material are used with different thermal drift rates and applying magnetic fields, it can be shown that:

$$\Phi_1 = V_1 B_1 L_1 \text{ and } \Phi_2 = V_2 B_2 L_2 \quad (2)$$

If we choose the materials so that:

$$\Phi_1 - \Phi_2 = \pi/4, \text{ and} \quad (3)$$

$$\partial_T \Phi_1 - \partial_T \Phi_2 = 0, \quad (4)$$

where $\partial_T$ is the partial derivative with respect to temperature. Then the tot thermal drift of the Faraday rotate angle can be cancelled out.

Combining Equations (1), (2), (3) and (4), can provide:

$$\partial_T \Phi_1 - \partial_T \Phi_2 = \partial_T(B_1 V_1 L_1) - \partial_T(B_2 V_2 L_2) = 0, \quad (5)$$

and $$B_1 V_1 L_1 - B_2 V_2 L_2 = \pi/4. \quad (6)$$

Under Saturated region:
The magnetic field strength B1 and B2 can be treated as constants Therefore:
Equation (5) can be rewritten as:

$$\partial_T \Phi_1 - \partial_T \Phi_2 = B[\partial_T(V_1 L_1) - \partial_T(V_2 L_2)] = B\ [L_{1\partial T}(V_1) + V_1 L_{1\alpha 1} - L_{2\partial T}(V_2) + V_2 L_{2\alpha 2}] = 0 (6-2)$$

Additionally Equation (6) can be written as, $$B_1 V_1 L_1 - B_2 V_2 L_2 = B(V_1 L_1 - V_2 L_2) = \pi/4 \quad (7)$$

The change in the Faraday rotation angle with respect to temperature $\Delta\Phi/\Delta T$, namely the thermal drift, can therefore be written for the first magnetic-optic material as:

$$\Delta\Phi_1 = \Delta T \times \partial_T(B_1 V_1 L_1) = \Delta T \times B L_1(\partial_T(V_1) + V_{1\alpha 1}). \quad (8)$$

And for the second magnetic-optic material as:

$$\Delta\Phi_2 = \Delta T \times \partial_T(B_2 V_2 L_2) = \Delta T \times B L_2(\partial_T(V_2) + V_{2\alpha 2}); \quad (9)$$

Where, $\alpha_1$ and $\alpha_2$ are the thermal expansion coefficients of the magnetic-optical materials.

For magnetic-optical material 1 GTD(for example), let $$(\partial_T V_1)/V_1 + \alpha_1 = \gamma_1 \quad (10)$$

And meanwhile, for magnetic-optical material 2 GLB(for example), let $$(\partial_T V_2)V_2 + \alpha_2 = \gamma_2 \quad (11)$$

Let $\Phi_1 = (r_1)(\pi/4); \Phi_2 = (r_2)(\pi/4);$ (12)

Equation (3) becomes $$r_1 - r_2 = 1; \quad (13)$$

and Equation (4) becomes $$\gamma_1 r_1 - \gamma_2 r_2 = 0; \quad (14)$$

$\gamma_1$ and $\gamma_2$ can be obtained from known data about the particular materials, e.g., from material data sheets.

$$r_2 = \gamma_1/(\gamma_2 - \gamma_1); \quad (15)$$

$$r_1 = \gamma_2/(\gamma_2 - \gamma_1); \quad (16)$$

Consequently, the materials and their Faraday rotation angles $\Phi_1$ and $\Phi_2$ can be specified to obtain a temperature insensitive 90 degree Faraday rotator mirror.

A wavelength insensitive 90 degree Faraday rotator mirror can be designed in a similar way.

The wavelength dependence of the Faraday rotation provided by the Faraday rotator mirror of FIG. 3 can be described as follows:

$$(\Phi)(\lambda) = V(\lambda) \times B \times L. \quad (17)$$

The Verdet constant has a wavelength dependence that can be described as:

$$V(\lambda) = (\pi/\lambda) \times [n(\lambda) - 1/n(\lambda)] \times [A + B/(\lambda^2 - \lambda_c^2)]; \quad (18)$$

where A and B are dispersion constants.
The conditions to get wavelength insensitive 90 degree Faraday rotator mirror are:

$$\Phi_1(\lambda c) - \Phi_2(\lambda c) = \pi/4; \quad (19)$$

$$\partial_\lambda \Phi_1 - \partial_\lambda \Phi_2 = \partial_\lambda(B_1 V_1 L_1) - \partial_\lambda(B_2 V_2 L_2) = 0 \quad (20)$$

Under saturated region;

$$(L_1)(\partial_\lambda)(V_1) - (L_2)(\partial_\lambda)(V_2) = 0 \quad (21)$$

In a similar way like in designing temperature insensitive device, the materials and their Faraday rotation angles $\Phi_1$ and $\Phi_2$ can be carefully specified to get a wavelength insensitive 90 degree Faraday rotator mirror.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. An apparatus comprising:
   a first Faraday rotator having an applied magnetic field in a first direction, including a first magneto-optic material and being configured to provide a first polarization rotation to light passing through the first magneto-optic material;
   a second Faraday rotator optically coupled to the first Faraday rotator, the second Faraday rotator having an applied magnetic field in a second direction in opposition to the first direction, including a second magneto-optic material and being configured to provide a second polarization rotation to light passing through the second magneto-optic material; and
   a mirror optically coupled to the second Faraday rotator, wherein the first magnetic-optic material and the second magnetic-optic material are different materials, the second magneto-optic material in the second Faraday rotator is configured to reverse polarization rotation caused by thermal drifting of the first magneto-optic material in the first Faraday rotator.

2. The apparatus of claim 1, wherein the first polarization direction and the second polarization rotation have opposite signs.

3. The apparatus of claim 1, wherein the first magnetic-optic material and the second magnetic-optic material are different garnet materials.

4. The apparatus of claim 1, wherein the first Faraday rotator and the second Faraday rotator are configured to flatten wavelength dependent polarization rotation caused by individual Faraday rotators of the first and second Faraday rotators.

5. The apparatus of claim 1, further comprising:
   an input port configured to input a light beam having one or more signal wavelengths; and
   an output port configured to output a light beam having one or more signal wavelengths.

6. The apparatus of claim 5, wherein the polarization direction of the input light beam is rotated by 90 degrees when entering the output port.

7. The apparatus of claim 5, wherein the input light beam passes through the first Faraday rotator and the second Faraday rotator before being reflected by the mirror, and wherein the light reflected from the mirror passes through the second Faraday rotator and the first Faraday rotator before passing through the output port.

8. An apparatus, comprising:
   a first Faraday rotator having an applied magnetic field in a first direction; and
   a second Faraday rotator having an applied magnetic field in a second direction in opposition to the first direction, wherein the polarization rotation caused by the second Faraday rotator is different in amount of rotation and has an opposite direction than the polarization rotation caused by the first Faraday rotator, wherein the first Faraday rotator includes a first magneto-optic material configured to provide a first polarization rotation to light passing through the first magneto-optic material, and wherein the second Faraday rotator includes a second magneto-optic material configured to provide a second polarization rotation of light passing through the second magneto-optic material, wherein the second magneto-optic material in the second Faraday rotator is configured to reverse polarization rotation caused by thermal drifting of the first magneto-optic material in the first Faraday rotator.

9. The apparatus of claim 8, wherein the first polarization direction and the second polarization rotation have opposite signs.

10. The apparatus of claim 8, wherein the first magnetic-optic material and the second magnetic-optic material are different garnet materials.

11. The apparatus of claim 8, wherein the first Faraday rotator and the second Faraday rotator are configured to compensate for thermal drift caused by each individual Faraday rotator.

12. The apparatus of claim 8, wherein the first Faraday rotator and the second Faraday rotator are configured to flatten wavelength dependent polarization rotation caused by individual Faraday rotators of the first and second Faraday rotators.

13. The apparatus of claim 8, wherein the polarization rotation caused by the second Faraday rotator is different in amount of rotation by substantially 45 degrees than the amount of rotation caused by the first Faraday rotator.

* * * * *